United States Patent [19]
Hermanson

[11] Patent Number: 5,892,506
[45] Date of Patent: Apr. 6, 1999

[54] MULTITRACK ARCHITECTURE FOR COMPUTER-BASED EDITING OF MULTIMEDIA SEQUENCES

[75] Inventor: David Hermanson, Westmount, Canada

[73] Assignee: Discreet Logic, Inc., Montreal, Canada

[21] Appl. No.: 617,400

[22] Filed: Mar. 18, 1996

[51] Int. Cl.$^6$ .................................................. G06T 11/00
[52] U.S. Cl. ........................................................ 345/302
[58] Field of Search ............................ 395/806, 807, 395/302, 345; 364/192, 193; 345/302, 326–328, 348, 349, 501; 707/500–502

[56] References Cited

U.S. PATENT DOCUMENTS

| | | | |
|---|---|---|---|
| 4,524,421 | 6/1985 | Serby et al. | 345/431 |
| 4,538,188 | 8/1985 | Barker et al. | 386/54 |
| 4,558,302 | 12/1985 | Welch | 341/51 |
| 4,602,286 | 7/1986 | Kellar et al. | 348/597 |
| 4,823,108 | 4/1989 | Pope | 345/340 |
| 5,077,610 | 12/1991 | Searby et al. | 348/593 |
| 5,212,544 | 5/1993 | Kellar et al. | 348/590 |
| 5,216,755 | 6/1993 | Walker et al. | 345/432 |
| 5,289,566 | 2/1994 | Walker et al. | 345/432 |
| 5,359,430 | 10/1994 | Zhang | 358/455 |
| 5,384,667 | 1/1995 | Beckwith | 386/55 |
| 5,398,120 | 3/1995 | Friedman et al. | 358/501 |
| 5,420,801 | 5/1995 | Dockter et al. | 345/501 |
| 5,428,731 | 6/1995 | Powers, III | 707/501 |
| 5,430,878 | 7/1995 | Straub et al. | 395/712 |
| 5,442,751 | 8/1995 | Patrick et al. | 345/523 |
| 5,455,600 | 10/1995 | Friedman et al. | 345/153 |
| 5,459,529 | 10/1995 | Searby et al. | 348/586 |
| 5,659,793 | 8/1997 | Escobar et al. | 345/302 |

FOREIGN PATENT DOCUMENTS 0 360 599 A2   9/1989   European Pat. Off. .

OTHER PUBLICATIONS

Little, T.D.C., "Time–based Media Representation and Delivery", Multimedia Systems, J.F. Koegel Buford, ed., ACM Press, New York, 1994, pp. 175–200.

Sherman A.R. et al., The EFX Editing and Effects Environment, IEEE Multimedia, Spring 1996, pp. 15–29.

*Primary Examiner*—Almis R. Jankus
*Attorney, Agent, or Firm*—Wells, St. John, Roberts, Gregory & Matkin, P.S.

[57] ABSTRACT

A multitrack architecture for computer-based editing of multimedia sequences is disclosed herein. The multimedia sequences are formed of a plurality of collated segments representing audio or video scenes. The architecture contains sequence tracks for ordering the segments of the multimedia sequence and process tracks for applying transformations and/or animations to some of these segments. The output of the process tracks may be supplied to other process tracks and/or to a sequence track. Scope controls are provided to determine which portion of the output of a process track is supplied to another process track and/or to a sequence track.

12 Claims, 6 Drawing Sheets

FIG_2 (PRIOR ART)

MULTITRACK ARCHITECTURE FOR COMPUTER-BASED EDITING OF MULTIMEDIA SEQUENCES

FIELD OF THE INVENTION

The present invention relates to computer-based editing. More specifically, the present invention relates to a multi-track architecture for computer-based editing of multimedia sequences.

BACKGROUND OF THE INVENTION

Many types of architectures for computer-based editing are found in the industry to manipulate or to edit sequences of video, audio or the like.

These conventional architectures may be divided into three broad categories: timeline, process nodes and animation curves architectures.

Timeline Architectures

Timeline editing involves the ordering of video and/or audio segments, each representing a single scene or a logical unit of video or audio data, into a multimedia sequence.

Figure 1:
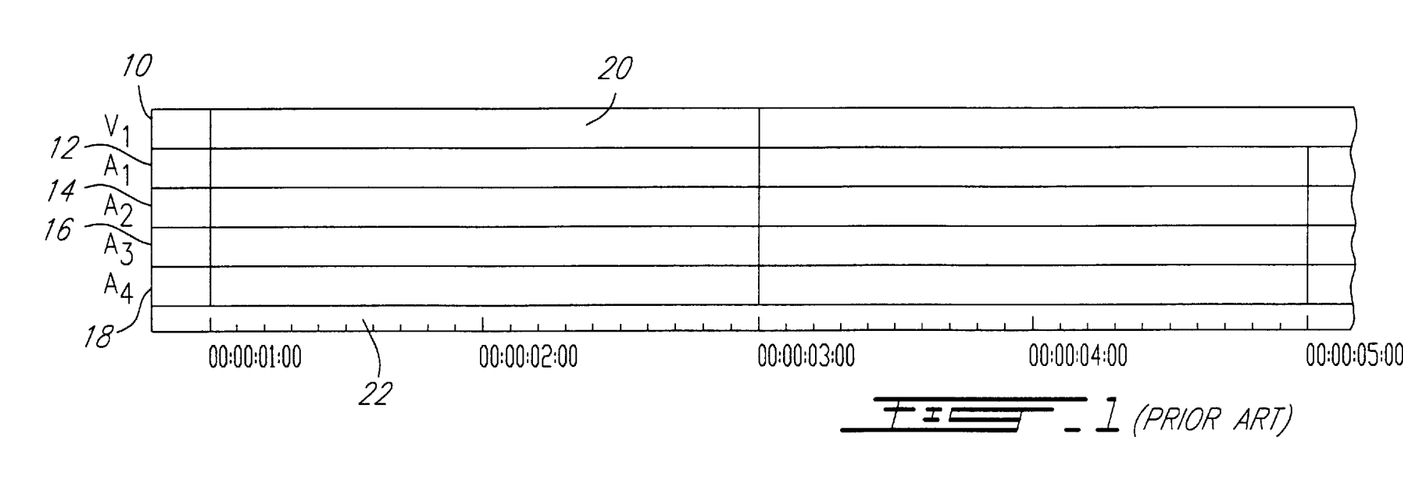
FIG. 1, which is labelled "Prior Art" illustrates a display screen of a conventional timeline editor.

FIG. 1 is a schematic view illustrating a display screen of a timeline editor. Timeline editors typically include a stack of horizontal bars 10–18 sub-divided into segments 20 which run along an x-axis 22 which is calibrated into time units.

Horizontal bar 10 is associated with a video channel while each horizontal bar 12 to 18 is associated with an audio channel. The video and audio channels are mapped onto particular playback devices. The order of the segments 20 on each horizontal bar 10 to 18 regulates the order in which these segments will be played on the playback device associated with each particular horizontal bar.

One of the advantages of timeline editing is that both the temporal arrangement of all the elements in a multimedia sequence as well as their relationship to the playback device is obvious to the user. Segments can be intuitively placed and reordered in time sequence as well as moved between playback channels.

One drawback of timeline editing is that it is impossible to modify the segments other than to modify their duration.

Process Node Architectures

Process node editing typically involves an arc and node graph, hereinafter referred to as a process node graph, in which each node can be either a source (input), a transformation (filter), or a sink (output). Each arc of a process node graph shows the passage of video or audio data from one node to another.

The purpose of the process node graph is to represent the construction history of a multimedia sequence. By following the arcs from the source(s) to the sink, the user may retrace the evolution of the segments being transformed or otherwise modified by each node.

Figure 2:
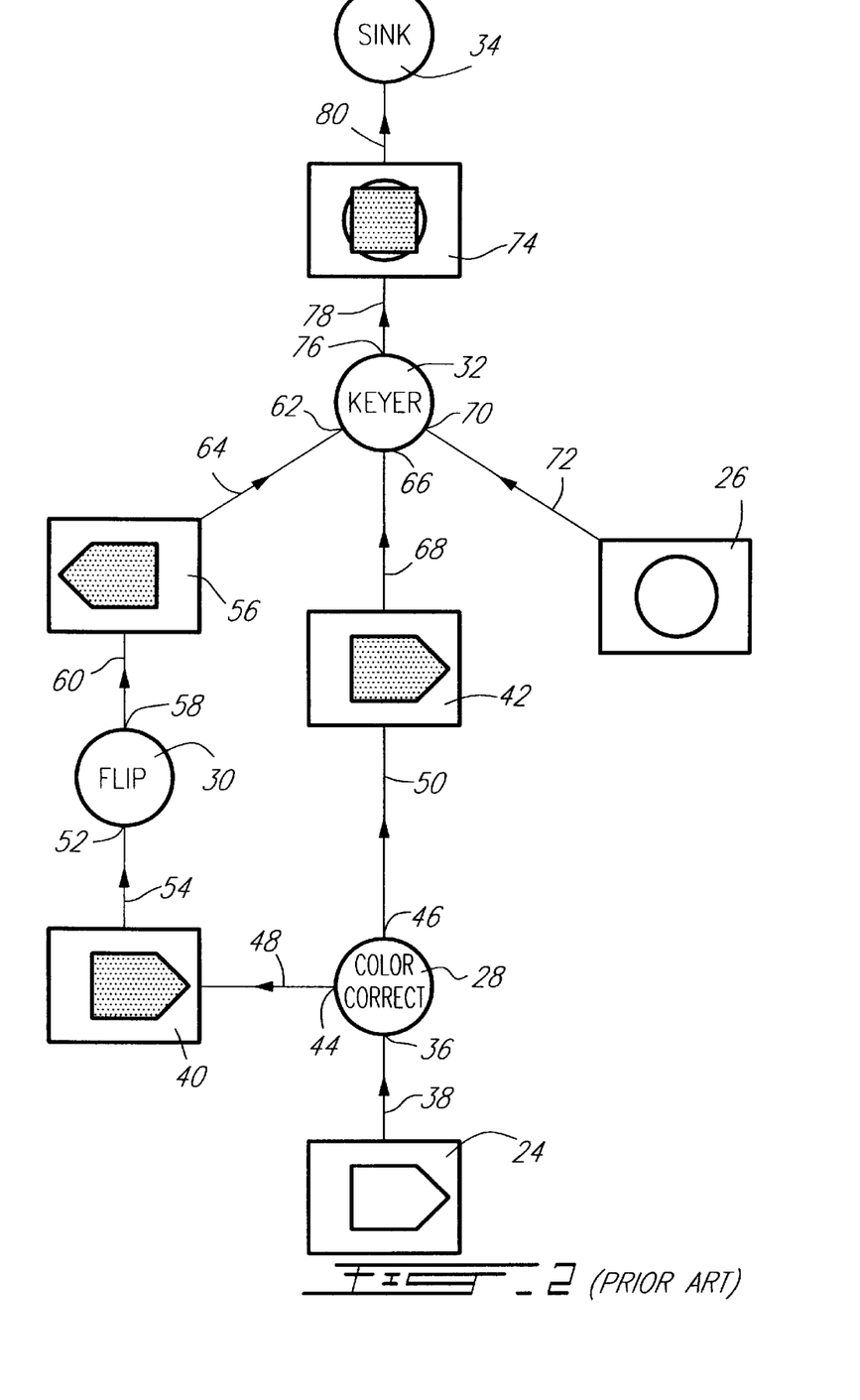
FIG. 2, which is labelled "Prior Art" illustrates a display screen of a conventional process node editor.

FIG. 2 of the appended drawings shows a simple process node graph illustrating the transformation of video segments. Two sources 24 and 26, and three transformations 28, 30 and 32 are used to produce a desired sink 34.

The segment of source 24 is supplied to an input 36 of the first transformation 28, which is a color corrector, through an arc 38. The result of the first transformation 28 is illustrated in the color corrected segments 40 and 42 respectively connected to outputs 44 and 46 is the first transformation 28 through arcs 48 and 50.

The color corrected segment 40 is supplied to an input 52 of the second transformation 30, which is a horizontal flip, through an arc 54. The result of the second transformation 30 is illustrated in the flipped color corrected segment 56 connected to an output 58 of the second transformation 30 via an arc 60. The flipped color corrected segment 56 is supplied to a first input 62 of the third transformation 32 via an arc 64.

The color corrected segment 42 is supplied to a second input 66 of the third transformation 32 via an arc 68.

The segment of the second source 26 is supplied to a third input 70 of the third transformation 32 via an arc 72.

The function of the third transformation 32, called a keyer, is to superpose a portion of the segment supplied to its first input 62 to the segment supplied to its third input 70. The portion superposed is defined by the segment supplied to its second input 66 which acts as a matte.

The result of the third transformation 32 is illustrated by the keyed segment 74 connected to an output 76 of the third transformation 32 via an arc 78. The keyed segment 74 is supplied to the sink 34 via an arc 80. As illustrated, the keyed segment 74 is the superposition of a portion of segment 56 over segment 26. The portion of segment 56 superposed corresponds to the portion which is in spacial correlation with segment 42.

One of the advantages of process node editing is that the operator has the ability to return to any previous node in the editing history of a sequence and make changes without having to redo subsequent steps which are automatically updated.

Another advantage is that the operator is able to specify many-to-many relationships between processes. For example, a single source could be shared between several different transformations such that a change to the source would be picked up by all the transformations simultaneously without any intervention from the user. For example, if source 24 is changed in FIG. 1, the entire process node graph illustrated will be modified accordingly.

A drawback of the process node architecture is the impossibility to manage the global timing of a sequence without a separate timeline editor.

Animation Curve Architectures

Animation curve editing typically involves a series of spline curves associated with a segment and placed on an x-y grid with each curve representing an animatable attribute of the segment. For example camera position, shininess, field of view, blurring, shadow, scaling, transparency, displacement, level, pan, and audio filtering are animatable attributes of video and/or audio segments.

Figure 3:
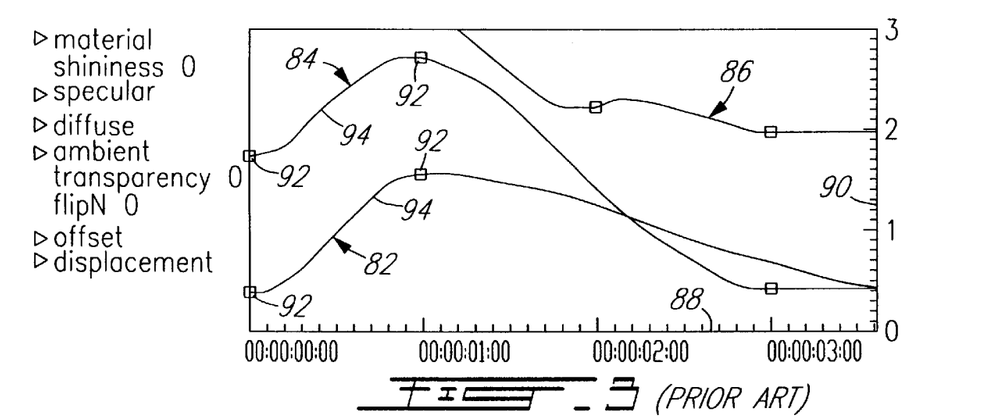
FIG. 3, which is labelled "Prior Art" illustrates a display screen of a conventional animation curve editor.

FIG. 3 of the appended drawings shows a simple animation curve screen of an animation curve editor illustrating three spline curves 82, 84 and 86 of a segment.

As illustrated, the x-axis 88 of the x-y grid is calibrated in time units and the y-axis 90 is used as a gauge of intensity of the animatable attribute associated with the spline curves.

Each spline curve 82, 84 and 86 is formed of a plurality of vertexes 92 each indicating a keyframe value of the attribute represented by the curve. These vertexes are interconnected by interpolated lines 94. It is to be noted that the functions used to compute the interpolated lines 94 may vary.

A user may modify the shape of any of the spline curves to thereby modify the way the attribute controlled by this particular spline curve is applied to the segment.

One advantage of animation curve editing is that the user has detailed control over the timing and intensity of a wide range of attributes of the segment being composed. In the case of video, for example, control can be exercised over the spatial positioning of elements in a scene or their surface characteristics. In the case of audio, the volume level or panning, for example, can be controlled.

Producing a Multimedia Sequence

Some of the conventional editing packages found on the market provide separate editors each having an architecture adapted to handle one of the three types of editing generally described hereinabove.

To produce a multimedia sequence using one of these conventional editing packages, assuming that video and audio scenes have already been properly transferred to appropriate audio and video segments, a user has to perform many different manipulations.

The first step is to modify some of the animation curves of the segments to obtain the desired animated segments. This step is performed with the help of the animation curve editor.

The second step is to supply the animated segments to a process node editor to apply various effects to the animated segments. It is to be noted that, since there is no link between the animation curve editor and the process node editor, the user, after having done some transformations to the animated segment and wishing to modify the animation, must return to the animation editor and therefore must subsequently redo all the previously done transformations.

The third step is to supply the sink of the process node editor, containing the resulting transformed and animated segment to the timeline editor to be able to modify the timing of the segment and its position relative to other segments.

As previously discussed, the user, when noting that there is a problem with either the animation or the transformations, must return to the appropriate editor, correct the problem and then redo all the steps leading to the desired segment of the sequence.

The three steps must be repeated for each segment of a multimedia sequence.

It is to be noted that the user, wishing to modify the length of a segment of a multimedia sequence that has been done according to the three steps defined hereinabove, must return to the animation curve step to select a different length of data and then redo all the subsequent steps.

It is to be noted that the period of time involved with the steps of applying the sink of the process node editor to the timeline editor may be quite long with conventional process node editors that have to produce the entire processed segment from the animated segment and the applied transformations (a step usually called rendering).

Modified Timeline Architecture

A modified timeline architecture has been designed to benefit from some of the advantages of the process node architecture while keeping some of the advantages of the timeline architecture. It is to be noted that in current practice, these enhancements only apply to the editing of video segments; audio media editing is still handled according to the conventional timeline architecture described hereinabove.

Figure 4:
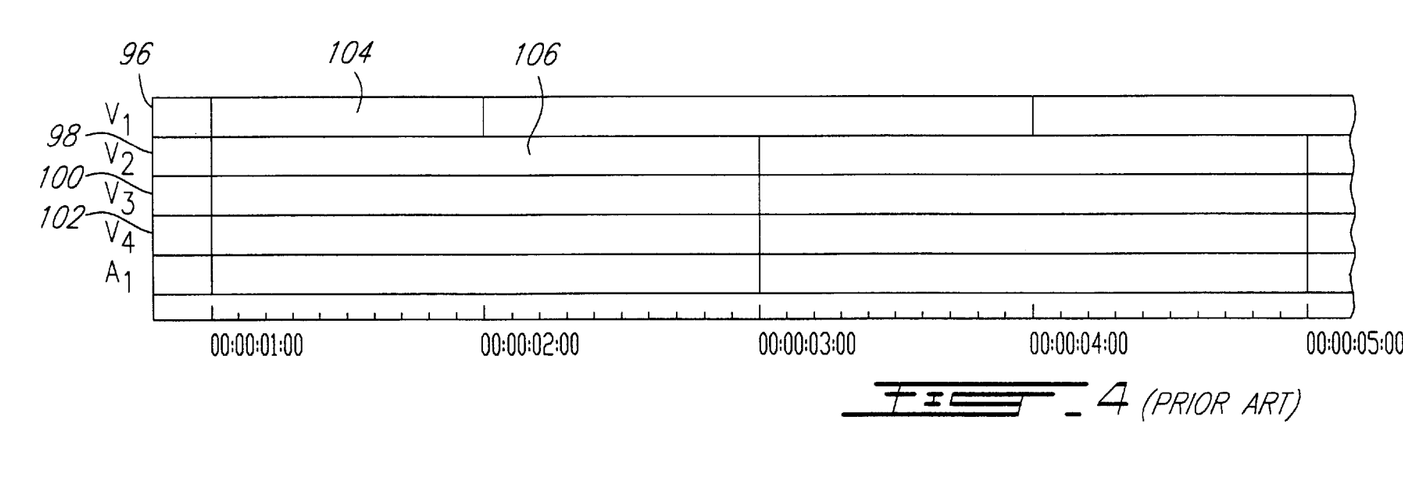
FIG. 4, which is labelled "Prior Art" illustrates a display screen of a modified timeline editor.

FIG. 4 is a schematic view illustrating a display screen of a modified timeline editor. In a modified timeline editor, more than one video track 96, 98, 100 and 102, are stacked. The segments of the top video track 96 can be specified as transformed segments of the other video tracks 98, 100 and/or 102. To use this feature, a localized transformation is applied to a segment of the video tracks placed below the top video track 96 and in time synchronization with it.

For example, in FIG. 4, segment 104 may be specified as a localized transformation of segment 106. This localized transformation will take place only in the time range specified by segment 104. Therefore, the length of the transformed segment 104 may be modified by moving its beginning and/or end onto the video track 96.

If the segment 104 is moved elsewhere on the video track 96, the localized transformation will be applied to the new segments placed in time synchronisation with the new position of the segment 104.

Conceptually, in the modified timeline architecture, the video tracks 96–102 can be thought of as a stack of transparent layers arranged from top to bottom. The resulting sequence can be visualized by looking down from the top through the layers.

The modified timeline architecture has several drawbacks, for example:

inputs to a localized transformation are implicit and dependent on the position of the localized transformation relative to the other video tracks; this characteristic can complicate the moving of segments when the inputs must remain fixed;

unlike in the conventional process node architecture, it is not possible to specify many-to-many relationships between segments;

managing large process histories can become cumbersome since two neighboring segments on one video track can both derive their inputs from the track below; it is difficult for the user to focus in on the construction history of a specific segment; and the modified timeline architecture does not work well when the duration of a segment is modified by a transformation applied to it.

SUMMARY OF THE INVENTION

The invention provides an improved architecture for computer-based editing of multimedia sequences.

One aspect of the invention provides an architecture for computer-based editing of multimedia sequences combining some features of conventional timeline, process nodes and animation curves editing architectures.

More specifically, in accordance with one aspect of the present invention, there is provided an editing system for computer-based editing of multimedia sequences using a multitrack architecture comprising:

at least one sequence track having a sequence node; the at least one sequence track being formed of a plurality of segments of multimedia related data; the sequence node including a sequence for ordering the plurality of segments in the sequence track;

at least one process track having a process node; the process node being configured so as to determine the function of the process track;

at least one scope control means removably attached to a process track and permanently attached to a sequence node; the scope control means transferring data from the process track to which it is removably attached to the sequence node to which it is permanently attached;

playback device supplied with the at least one sequence track.

According to another aspect of the present invention, there is provided a method for computer-based editing of multimedia sequences using a multitrack architecture comprising the steps of:

forming at least one sequence track having a sequence node; the at least one sequence track being formed of a plurality of segments of multimedia related data; the sequence node including a sequence for ordering the plurality of segments in the sequence track;

forming at least one process track having a process node; the process node being configured so as to determine the function of the process track;

providing at least one scope control means removably attached to a process track and permanently attached to a sequence node; the scope control means transferring data from the process track to which it is removably attached to the sequence node to which it is permanently attached;

supplying tue at least one sequence track to a playback device.

Other objects, advantages and features of the present invention will become more apparent upon reading of the following non restrictive description of preferred embodiments thereof, given by way of example only with reference to the accompanying drawings.

DESCRIPTION OF PREFERRED EMBODIMENTS

It has been found that it is possible to provide a multitrack architecture for computer-based editing of multimedia sequences incorporating characteristics of conventional timeline, process nodes and animation curves editors without the drawbacks of the modified timeline architecture described hereinabove.

In the present description and in the appended claims, the term "source" is used to define data representing audio, video or the like and which is under a form which is readable by a computer, while the term "sink" is used to define data representing audio, video or the like and which is under a form which is adapted to be supplied to a playback device. The term "multimedia" is used herein to refer to audio, video or audio/video.

The proposed multitrack architecture is designed to produce multimedia sequences which are obtained through the manipulation of audio and video data onto a plurality of tracks each including a node.

The tracks are divided into two categories: sequence tracks each including a sequence node and process tracks each including a process node. The process nodes may either take the form of transform nodes or source nodes.

Each sequence track is formed of a plurality of segments arranged in an order dictated by its sequence node.

If a track is used to output the sequence of its segment(s) onto a playback device, this track is called a result track. Many types of playback devices may be used to playback a sequence track. For example, a video monitor, a video recorder. It is also to be noted that a result track may be supplied to a recording device for subsequent visualisation on a playback device.

Each segment of a sequence track contains an input to the sequence node of the sequence track. A track, either a sequence track or a process track, is connected to each input of the sequence node of a sequence track to supply this input with audio and/or video data.

A process track may either be a source, a portion of a source, the result of a single transformation of a single source, the result of a plurality of transformations of a single source, the result of a single transformation of a plurality of sources, etc. To summarize, in the multitrack architecture, each track which is not a sequence track is a process track.

As will be understood by someone of ordinary skills in the art, the multitrack architecture described herein may be implemented on a computer comprising computer memory to contain a plurality of multimedia segments.

Figure 5:
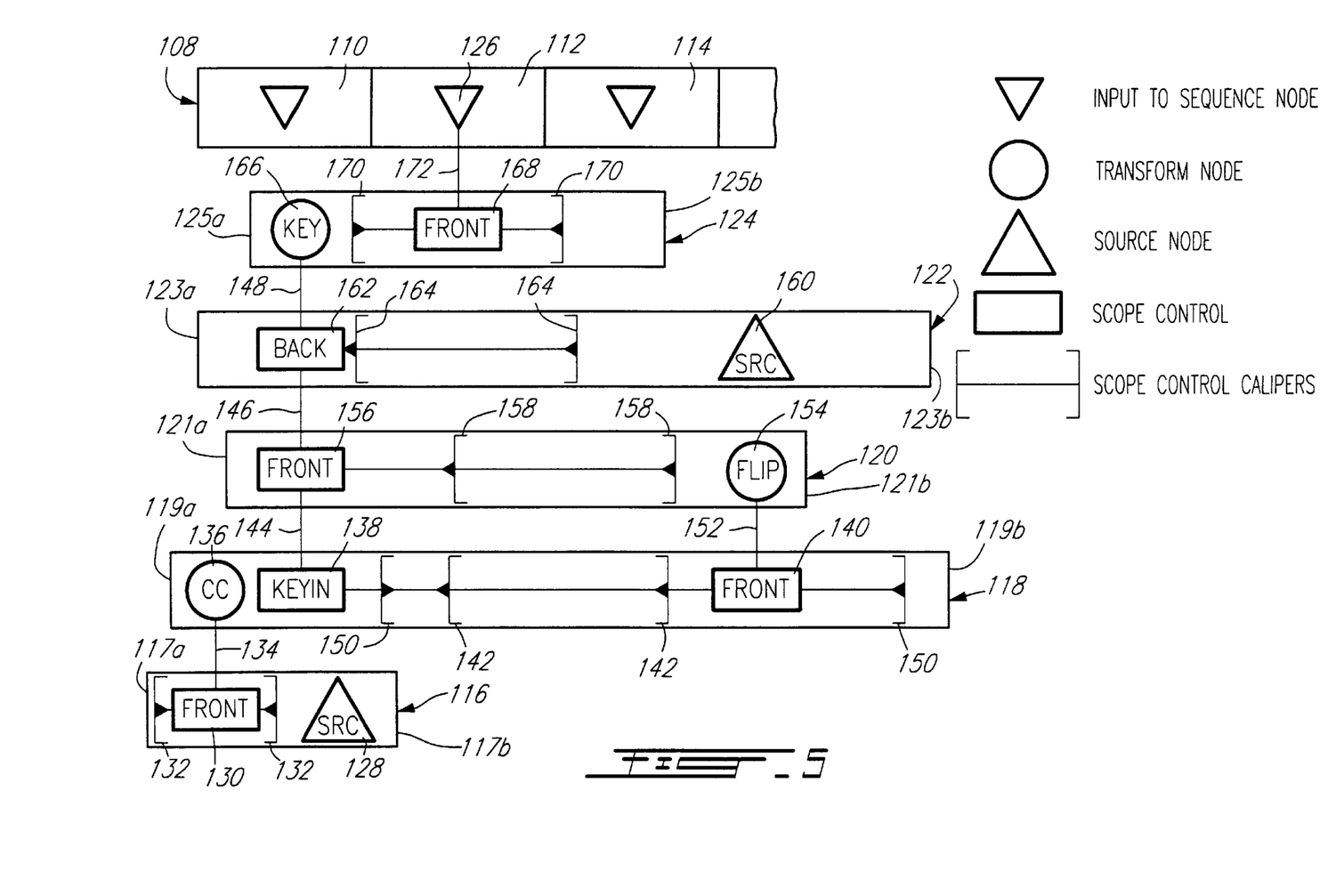
FIG. 5 illustrates a first display screen of a multitrack editor according to an embodiment of the multitrack architecture of the present invention.

FIG. 5 of the appended drawings schematically illustrates a display screen of a multitrack editor according to an embodiment of the multitrack architecture of the present invention. In this figure, the downwardly projecting triangles represent inputs to the sequence node (not shown); the circles represent transform nodes; the upwardly projecting triangles represent source nodes; the rectangles represent scope controls; the brackets represent scope control calipers; the full vertical lines connecting scope controls to transform nodes represent media pipes transferring data from the scope controls to the transform nodes.

As illustrated, only one process node, i.e., a source node or a transform node, is contained in each process track. This process node determines the function of the process track.

Source nodes are links to video and audio data or the like and are used to associate this data to the process track.

Transform nodes are effects applied to the result of at least one other track. The result of the other track is supplied to the transform node through a scope control having scope control calipers determining the portion of the other track to transfer to the transform node.

Scope controls are also used to transfer data between a process track and an input of a sequence node. Again, the scope control calipers determine the portion of the process track to transfer to the input of the sequence node.

In FIG. 5, the illustrated screen includes a sequence track 108 containing a plurality of segments such as 110, 112 and 114.

It is to be noted that, for clarity purposes, only segment 112 will be described in detail with reference to FIG. 5. Segments 110 and 114 may represent other scenes of the sequence of sequence track 108.

As illustrated in this figure, five process tracks 116–124 are required to produce the desired segment to be supplied to an input 126 of the sequence node (not shown) of the sequence track 108.

Process track 116 includes a source node 128. A scope control 130 having scope control calipers 132 is attached to the process track 116. The duration of the data contained in the source node 128 is illustrated by the width of the process track 116 extending from line 117a to 117b. The calipers 132 determine what portion of the data contained in the source node 128 is to be transferred to process track 118 through media pipe 134.

It is to be noted that the user may independently move the calipers 132 in the track 116 to modify the portion of the source 128 to be transferred to process track 118.

Scope control 130 is labelled "FRONT" to indicate to the user that the media pipe 134 transfers the data to a "FRONT" input of a subsequent transform node.

Process track 118 includes a transform node 136. Two scope controls 138 and 140 are attached to the process track 118. Transform node 136 is labelled "CC" to indicate to the user that this node is a color correction filter applied to its "FRONT" input. The portion of the source 128 which is transferred to the "FRONT" input of the transform node 136 is therefore color corrected. The duration of the result of the color correction is illustrated by the width of the process track 118 extending from line 119a to 119b.

Scope control 138 has scope control calipers 142 indicating what portion of the result of the color correction must be transferred to process track 124 through media pipes 144, 146 and 148. Scope control 138 is labelled "KEYIN" to indicate to the user that the media pipes 144, 146 and 148 transfer this data to a "KEYIN" input of a subsequent transform node.

Scope control 140 has scope control calipers 150 indicating what portion of the result of the color correction must be transferred to process track 120 through media pipe 152. Scope control 140 is labelled "FRONT" to indicate to the user that the media pipe 152 transfers this data to a "FRONT" input of a subsequent transform node.

It is to be noted that the portion of the result of the color correction transferred to the process track 124 is different from the portion transferred to the process track 120. The same color correction has therefore been used to supply two different process tracks with potentially different results from a common transformation.

It is also to be noted that the duration of the result of the color correction transform node 136 is significantly longer than the duration of the portion of the source node 128 transferred to the "FRONT" input of the transform node 136. This duration increase is done by the transform node 136 by repeating the totality or a portion of the data transferred to it.

Again, scope control calipers 142 and 150 may independently be moved in the process track 118 by the user to select the data transferred by scope controls 138 and 140, respectively.

Process track 120 includes a transform node 154. A scope control 156 is attached to the process track 120. Transform node 154 is labelled "FLIP" to indicate to the user that this node applies a horizontal flip transformation to its input. The portion of the color corrected data transferred to the "FRONT" input of the transform node 154 is therefore horizontally flipped. The duration of the result of the flip transform node 154 is illustrated by the width of the process track 120 extending from line 121a to 121b.

Scope control 156 has scope control calipers 158 indicating what portion of the result of the flip transform must be transferred to process track 120 through media pipes 146 and 148. Scope control 156 is labelled "FRONT" to indicate to the user that the media pipes 146 and 148 transfer this data to a "FRONT" input of a subsequent transform node.

Again, scope control calipers 158 may be moved in the process track 120 by the user to select the data transferred by scope control 156.

Process track 122 includes a source node 160. A scope control 162 having scope control calipers 164 is attached to the process track 122. The duration of the data contained in the source node 160 is illustrated by the width of the process track 122 extending from line 123a to line 123b. The calipers 164 determine what portion of the data contained in the source node 160 is to be transferred to process track 124 through media pipe 148.

Scope control 162 is labelled "BACK" to indicate to the user that the media pipe 148 transfers this data to a "BACK" input of a subsequent transform node.

Process track 124 includes a transform node 166. A scope control 170 is attached to the process track 124. Transform node 168 is labelled "KEY" to indicate to the user that this node applies a keyer transformation to its inputs. More specifically, the keyer transformation consists in the superposition of a portion of the data supplied to the "FRONT" input onto the data supplied to the "BACK" input. The portion of the "FRONT" input which is superposed onto the "BACK" input is determined by the "KEYIN" input which acts as a matte.

The duration of the result of the keyer transform node 166 is illustrated by the width of the process track 124 extending from line 125a to line 125b.

Scope control 168 has scope control calipers 170 indicating what portion of the result of the keyer transform must be transferred to the input 126 of the sequence node of the sequence track 108 through media pipe 172. Scope control 168 is labelled "FRONT" to indicate to the user that the media pipe 172 transfers this data to a "FRONT" input.

Again, scope control calipers 170 may be moved in the process track 124 by the user to select the data transferred by scope control 168.

It is important to note that the display screen illustrated in FIG. 5 is only an example of what may be done with the multitrack architecture and should not be interpreted in any way as limiting the scope of the present invention. Any transformation which may be done with conventional timeline, process node and animation curve architecture, as well as other types of transformations could be integrated in a multitrack architecture as defined herein. The type of transformation used is therefore not relevant to the present invention.

It is also to be noted that the scope controls are permanently linked to the process nodes to which they are connected to through the media pipes. It is possible to move a scope control from one process track to another to thereby change the data transferred to the input of the process node that is linked to the scope control.

Figure 6:
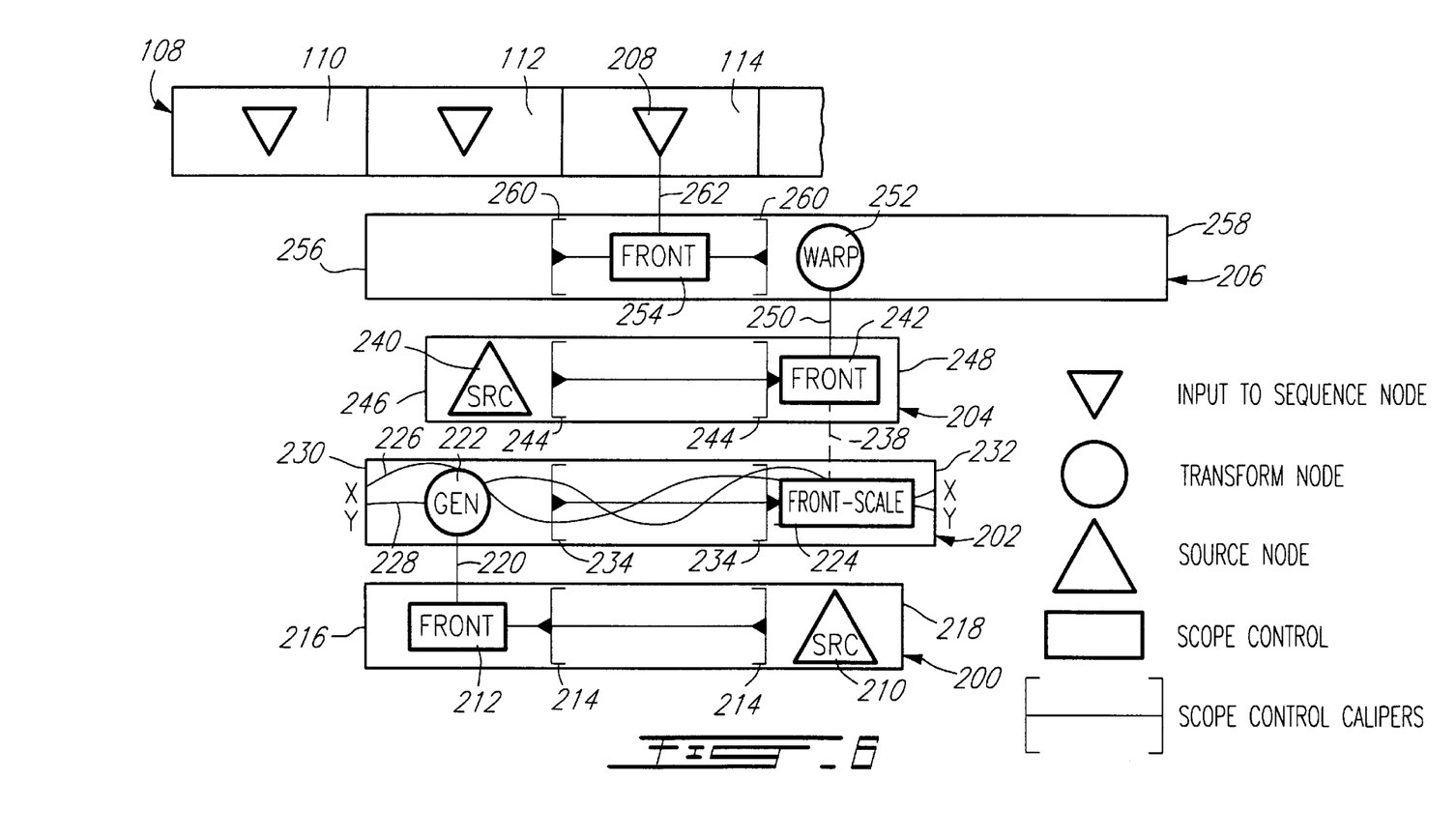
FIG. 6 illustrates a second display screen of a multitrack editor according to an embodiment of the multitrack architecture of the present invention.

Turning now to FIG. 6, a second display screen of a multitrack editor according to an embodiment of the multitrack architecture of the present invention will be described. FIG. 6 illustrates in details segment 114 of sequence track 108.

It is to be noted that, in this figure, vertical dashed lines represent animation pipes transferring animation data from scope controls to transform nodes.

Four process tracks 200–206 are required to produce the desired data to be supplied to an input 208 of the sequence node (not shown) of the sequence track 108.

Process track 200 includes a source node 210. A scope control 212 having scope control calipers 214 is attached to the process track 200. The duration of the data contained in the source node 210 is illustrated by the width of the process track 200 extending from line 216 to 218. The calipers 214 determine what portion of the data contained in the source node 210 is to be transferred to process track 202 through media pipe 220.

It is to be noted that the user may independently move the calipers 214 in the track 200 to modify the portion of the source 210 to be transferred to process track 202.

Scope control 212 is labelled "FRONT" to indicate to the user that the media pipe 220 transfers the data to a "FRONT" input of a subsequent transform node.

It is to be noted that source node 210 can be used most advantageously as a link to audio data as will be explained hereinafter.

Process track 202 includes a transform node 222. A scope control 224 is attached to the process track 202. Transform node 222 is labelled "GEN" to indicate to the user that this node is a waveform generator that computes waveforms from its "FRONT" input. The portion of the audio data transferred to the "FRONT" input of the transform node 222 is therefore used to compute two different waveforms 226 (labelled X) and 228 (labelled Y).

The duration of the result of the "GEN" transform node 222 is illustrated by the width of the process track 202 extending from line 230 to 232.

Scope control 224 has scope control calipers 234 indicating what portion of the resulting waveforms of the "GEN" transform must be transferred to process track 206 through an animation pipe 238. Scope control 234 is labelled "FRONT-SCALE" to indicate to the user that the animation pipe 238 transfers this data to a "FRONT-SCALE" animation input of a subsequent transform node.

Again, scope control calipers 234 may be moved in the process track 202 by the user to select the data transferred by scope control 224.

Process track 204 includes a source node 240. A scope control 242 having scope control calipers 244 is attached to the process track 204. The duration of the data contained in the source node 240 is illustrated by the width of the process track 204 extending from line 246 to line 248. The calipers 244 determine what portion of the data contained in the source node 240 is to be transferred to process track 206 through media pipe 250.

Scope control 242 is labelled "FRONT" to indicate to the user that the media pipe 250 transfers this data to a "FRONT" input of a subsequent transform node.

It is to be noted that source node 242 can be used advantageously as a link to video data as will be explained hereinafter.

Process track 206 includes a transform node 252. A scope control 254 is attached to the process track 206. Transform node 252 is labelled "WARP" to indicate to the user that this node applies a warp transformation to its inputs. More specifically, in this example, the warp transformation consists in the variable adjustment of the X and Y scaling factors of the data supplied to the "FRONT" input of the warp transform node according to the X and Y waveforms 226 and 228 generated by the "GEN" transform node 222.

The duration of the result of the warp transform node 252 is illustrated by the width of the process track 206 extending from line 256 to line 258.

Scope control 254 has scope control calipers 260 indicating what portion of the result of the warp transform must be transferred to the input 208 of the sequence node of the sequence track 108 through media pipe 262. Scope control 254 is labelled "FRONT" to indicate to the user that the media pipe 262 transfers this data to a "FRONT" input.

Again, scope control calipers 260 may be moved in the process track 258 by the user to select the data transferred by scope control 254.

Again, it is important to note that the display screen illustrated in FIG. 6 is only an example of what may be done with the multitrack architecture and should not be interpreted in any way as limiting the scope of the present invention. Any transformation which may be done with conventional timeline, process node and animation curve architecture, as well as other types of transformations could be integrated in a multitrack architecture as defined herein. The type of transformation used is therefore not relevant to the present invention.

Figure 7:
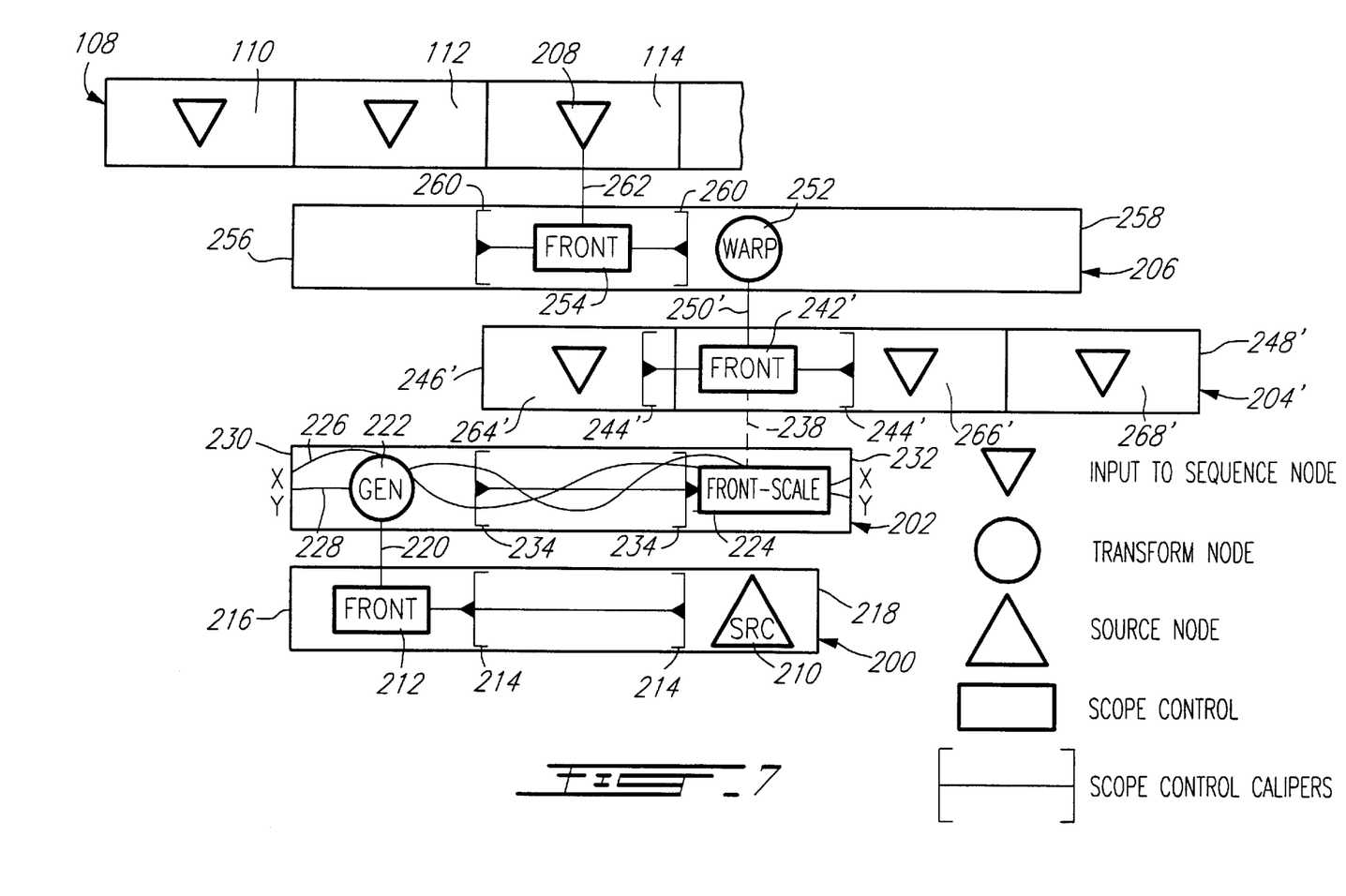
FIG. 7 illustrates a third display screen of a multitrack editor according to an embodiment of the multitrack architecture of the present invention.

Turning now to FIG. 7 of the present invention, a third display screen of a multitrack editor according to an embodiment of the multitrack architecture of the present invention will be described.

It is to be noted that the third display screen illustrated in FIG. 7 is very similar to the second display screen illustrated in FIG. 6. Accordingly, elements of FIG. 7 that are similar to elements of FIG. 6 bear the same numerals.

A major difference is that the process track 204 of FIG. 6 is replaced by a sequence track 204'.

Sequence track 204' includes a sequence node (not shown) and, in this example, three video segments 264', 266' and 268'. A scope control 242' having scope control calipers 244' is attached to the sequence track 204'. The duration of the data contained in the segments 264', 266' and 268' is illustrated by the width of the process track 204' extending from line 246' to line 248'. The calipers 244' determine what portion of the data contained in the source node 240' is to be transferred to process track 206' through media pipe 250'.

Scope control 242' is labelled "FRONT" to indicate to the user that the media pipe 250' transfers this data to a "FRONT" input of a subsequent transform node.

Therefore, the major conceptual difference between the second display screen of FIG. 6 and the third display screen of FIG. 7 is that the data supplied to the "FRONT" input of the warp transform node 252 come from a plurality of segments of a sequence track 204' (FIG. 7) instead of coming from the source node 240 of the process track 204 (FIG. 6).

As will be understood by someone of ordinary skills in the art, it is therefore possible to freely exchange a sequence track with a process track having a source node.

Returning to FIG. 7, if the sequence track 108 is supplied to an adequate playback device it may be considered as a result track and the desired sequence of segments having been properly transformed may be visualized through the playback device.

It is to be noted that any tracks may be supplied to an adequate playback device for visualisation purposes so as to determine if the desired effect is accomplished.

It is to be noted that many types of transform nodes include animation curves embedded therein that may be manipulated by the user at his convenience. These animation curves are not usually shown on the display screen since their number would make the visualisation of the process tracks difficult. For example, the color correct transform node 136 of FIG. 5 contains every animation curve associated with animatable attributes of video data (such as, for example, hue, saturation, highlight and shadows). These curves may be selectively displayed in the process track 118 at the command of the user. When these curves are displayed, their shape may be modified by the user.

It is also to be noted that any type of transition may be used between the successive segments of a sequence track. In the appended drawings, only cut-type transitions were illustrated but any type of transition could be substituted for these cut-type transitions, for example, dissolve transitions and wipe transitions could be incorporated.

Unlike in the modified timeline architecture, when a user wishing to move or to copy a segment from one position to another may specify the behavior of the scope control associated with the input of the sequence node of this particular segment. Indeed, if the user decides that the desired effect is achieved by the segment to be moved or copied, may specify that the scope control, including the scope control calipers, must remain in their respective position. Alternatively, if the user wishes to modify the portion of the segment associated with the scope control that is transferred to the input of the sequence node, may specify that the scope control, including the scope control calipers, must follow the moved or copied segment.

It is also to be noted that the position of the process tracks below the sequence track is not required and that this positioning has been used for illustration purposes only. The process tracks could be placed anywhere on the screen of a multitrack editor. In this case, the media pipes and the animation pipes connecting the scope controls to the process nodes would not necessarily be vertical lines.

Although the present invention has been described hereinabove by way of preferred embodiments thereof, it can be modified, without departing from the spirit and nature of the subject invention as defined in the appended claims.

What is claimed is:

1. A multitrack architecture for computer-based editing of multimedia sequences stored on a computer readable medium; said multitrack architecture comprising:

at least one process track having a process node; said process track including multimedia related data; said process node being configured so as to determine the function of the process track;

at least one sequence track having a sequence node; said at least one sequence track being provided with a plurality of segments each provided with an input to said sequence node; each said input having respective first scope control permanently connected thereto; each first scope control enabling a removable connection between a respective input and one of said process track; wherein said first scope control is so configured as to determine the portion of multimedia data transferred from said process track to which it is removably connected to said respective input of said sequence node; said sequence node including a sequence for ordering said plurality of segments in said sequence track; said first scope control including a first scope control element and scope control calipers fixedly attached to a said scope control element; said scope control calipers being removably attached to one of said process track and being configured so as to determine the portion of multimedia data transferred from said process track to said input.

2. A multitrack architecture for computer-based editing of multimedia sequences stored on a computer readable medium; said multitrack architecture comprising:

at least one process track having a process node; said process track including multimedia related data; said process node being configured so as to determine the function of the process track; at least one of said process node includes at least one input;

at least one sequence track having a sequence node; said at least one sequence track being provided with a plurality of segments each provided with an input to said sequence node; each said input having respective first scope control permanently connected thereto; each first scope control enabling a removable connection between a respective input and one of said process track; wherein said first scope control is so configured as to determine the portion of multimedia data transferred from said process track to which it is removably connected to said respective input of said sequence node; said sequence node including a sequence for ordering said plurality of segments in said sequence track;

each said input of said process node having respective second scope control permanently connected thereto; each second scope control enabling a removable interconnection between respective process tracks.

3. A multitrack architecture as recited in claim 2, wherein each said second scope control interconnects a respective input of a process node of a first process track and multimedia data included in a second process track; said second scope control being configured so as to determine the portion of multimedia data transferred from said second process track to said first process track.

4. A multitrack architecture as recited in claim 3, wherein said second scope control includes:

a second scope control element configured as to illustrate a type of input to which the second scope control is permanently connected;

second scope control calipers fixedly attached to a said scope control element; said second scope control calipers being removably attached to said second process track and being configured so as to determine the portion of multimedia data transferred from said second process track to said input of said first process track.

5. An article of manufacture comprising a computer usable medium having a computer readable code means embodied in said medium for editing multimedia sequences using a multitrack architecture, the computer readable program code in said article of manufacture comprising:

computer readable program code means for causing the computer to generate at least one process track having a process node; said process track including multimedia related data; said process node being configured so as to determine the function of the process track;

computer readable program code means for causing the computer to generate at least one sequence track having a sequence node; said at least one sequence track being provided with a plurality of segments each provided with an input to said sequence node; each said input having respective first scope control permanently connected thereto; each first scope control enabling a removable connection between a respective input and one of said process track; wherein said first scope control is so configured as to determine the portion of multimedia data transferred from said process track to which it is removably connected to said respective input of said sequence node; said sequence node including a sequence for ordering said plurality of segments in said sequence track; said first scope control including a first scope control element and scope control calipers fixedly attached to a said scope control element; said scope control calipers being removably attached to one of said process track and being configured so as to determine the portion of multimedia data transferred from said process track to said input.

6. An article of manufacture comprising a computer usable medium having a computer readable code means embodied in said medium for editing multimedia sequences using a multitrack architecture, the computer readable program code in said article of manufacture comprising:

computer readable program code means for causing the computer to generate at least one process track having a process node; said process track including multimedia related data; said process node being configured so as to determine the function of the process track; at least one of said process node includes at least one input;

computer readable program code means for causing the computer to generate at least one sequence track having a sequence node; said at least one sequence track being provided with a plurality of segments each provided with an input to said sequence node; each said input having respective first scope control permanently connected thereto; each first scope control enabling a removable connection between a respective input and one of said process track; wherein said first scope control is so configured as to determine the portion of multimedia data transferred from said process track to which it is removably connected to said respective input of said sequence node; said sequence node including a sequence for ordering said plurality of segments in said sequence track;

each said input of said process node having respective second scope control permanently connected thereto; each second scope control enabling a removable interconnection between respective process tracks.

7. An article of manufacture as recited in claim 6, wherein each said second scope control means interconnects a respective input of a process node of a first process track and multimedia data included in a second process track; said second scope control means being configured so as to determine the portion of multimedia data transferred from said second process track to said first process track.

8. An article of manufacture as recited in claim 7, wherein said second scope control means include:

a second scope control element configured as to illustrate a type of input to which the second scope control means is permanently connected;

second scope control calipers fixedly attached to a said scope control element; said second scope control calipers being removably attached to said second process track and being configured so as to determine the portion of multimedia data transferred from said second process track to said input of said first process track.

9. A program storage device readable by a machine tangibly embodying a program of instructions executable by the machine to perform method steps for editing a multimedia sequence using a multitrack architecture, said method steps comprising:

generating at least one process track having a process node; said process track including multimedia related data; said process node being configured so as to determine the function of the process track;

generating at least one sequence track having a sequence node; said at least one sequence track being provided with a plurality of segments each provided with an input to said sequence node; each said input having respective first scope control permanently connected thereto; each first scope control enabling a removable connection between a respective input and one of said process track; wherein said first scope control is so configured as to determine the portion of multimedia data transferred from said process track to which it is removably connected to said respective input of said sequence node; said sequence node including a sequence for ordering said plurality of segments in said sequence track; said first scope control including a first scope control element and scope control calipers fixedly attached to a said scope control element; said scope control calipers being removably attached to one of said process track and being configured so as to determine the portion of multimedia data transferred from said process track to said input.

10. A program storage device readable by a machine tangibly embodying a program of instructions executable by the machine to perform method steps for editing a multimedia sequence using a multitrack architecture, said method steps comprising:

generating at least one process track having a process node; said process track including multimedia related data; said process node being configured so as to determine the function of the process track; at least one of said process node includes at least one input;

generating at least one sequence track having a sequence node; said at least one sequence track being provided with a plurality of segments each provided with an input to said sequence node; each said input having respective first scope control permanently connected thereto; each first scope control enabling a removable connection between a respective input and one of said process track; wherein said first scope control is so configured as to determine the portion of multimedia data transferred from said process track to which it is removably connected to said respective input of said sequence node; said sequence node including a sequence for ordering said plurality of segments in said sequence track;

each said input of said process node having respective second scope control permanently connected thereto; each second scope control enabling a removable interconnection between respective process tracks.

11. A program storage device readable by a machine, as recited in claim 10, wherein said each second scope control means generated by said process track generating step interconnects a respective input of a process node of a first process track and multimedia data included in a second process track; said second scope control means being configured so as to determine the portion of multimedia data transferred from said second process track to said first process track.

12. A program storage device readable by a machine, as recited in claim 11, wherein said second scope control means generated by said process track generating step include:

a second scope control element configured as to illustrate a type of input to which the second scope control means is permanently connected;

second scope control calipers fixedly attached to a said scope control element; said second scope control calipers being removably attached to said second process track and being configured so as to determine the portion of multimedia data transferred from said second process track to said input of said first process track.

* * * * *